US008752658B2

(12) United States Patent
Kurek

(10) Patent No.: US 8,752,658 B2
(45) Date of Patent: Jun. 17, 2014

(54) MOTORIZED WALKER

(76) Inventor: Gary Kurek, Fort Kent (CA)

( * ) Notice: Subject to any disclaimer, the term of this patent is extended or adjusted under 35 U.S.C. 154(b) by 953 days.

(21) Appl. No.: 12/366,270

(22) Filed: Feb. 5, 2009

(65) Prior Publication Data

US 2010/0193264 A1 Aug. 5, 2010

(51) Int. Cl.
*B62D 51/04* (2006.01)

(52) U.S. Cl.
USPC .......................................... 180/65.1; 180/19.1

(58) Field of Classification Search
USPC ................ 180/65.1, 19.1; 297/5; 280/87.021, 280/97.03, 87.041
See application file for complete search history.

(56) References Cited

U.S. PATENT DOCUMENTS 5,390,753 A 2/1995 Parker
6,059,060 A * 5/2000 Kanno et al. ................. 180/65.8
6,199,647 B1 3/2001 Schaffner et al.
6,209,670 B1 * 4/2001 Fernie et al. .................... 180/12
6,752,224 B2 * 6/2004 Hopper et al. .................. 180/22
7,104,346 B2 9/2006 Schaffner

OTHER PUBLICATIONS

XTi Hub Motors performance data sheet. "12 Volt DC—8" Blue (Solid Rubber Tire) With Electrically Released Friction Disc."
Website excerpt. "Features of The Hugo Standard Rolling Walker." http://www.hugoanywhere.com/comersus/store/comersus_viewItem.asp?idProduct=1. Accessed Nov. 13, 2008.

* cited by examiner

*Primary Examiner* — Jeffrey J Restifo
*Assistant Examiner* — Erez Gurari
(74) *Attorney, Agent, or Firm* — Anthony R. Lambert

(57) ABSTRACT

A motorized walker, comprising a wheel mounted frame supporting a seat and retractable motor driven mid-drive drive wheels. Other features include the motor and drive wheels being mounted on a retractable sub-frame, with the retractable sub-frame comprising a pair of triangular frames, and a foot rest pivotally mounted on the retractable sub-frame. A method of making the motorized walker is also provided.

10 Claims, 4 Drawing Sheets

MOTORIZED WALKER

TECHNICAL FIELD

Motorized walkers.

BACKGROUND

Walkers are used by people with walking difficulties to support them while walking. An exemplary walker is the Hugo Rollator™. Walkers need to be manipulable by a user, and thus need to be relatively light. Consequently, walkers tend not to be motorized. One walker, shown in U.S. Pat. No. 5,390,753, is provided with drive wheels, but the rear wheels are lifted up to cause the drive wheels to contact the ground (thus reducing stability) and the design does not include a seat. On the other hand, motorized wheelchairs, such as described in U.S. Pat. No. 6,199,647, are known that have a mid-wheel drive, but these tend to be heavy and the drive wheels are permanently engaged. There is a need for a new motorized walker.

SUMMARY

In an embodiment, there is disclosed a motorized walker, comprising a wheel mounted frame supporting a seat and retractable motor driven mid-drive drive wheels. Other features include the motor drive wheels being mounted on a retractable sub-frame, with the retractable sub-frame comprising a pair of triangular frames, and a foot rest pivotally mounted on the retractable sub-frame.

A method of making a motorized walker is also provided. The method includes obtaining a walker comprising a frame supporting a seat, the frame being supported by front ground contacting wheels and rear ground contacting wheels, and having handles on an upper portion of the frame suitable to be gripped by a human; suspending retractable motor driven wheels from the frame between the front ground contacting wheels and the rear ground contacting wheels; and mounting controls for the motor driven wheels on the frame.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

Figure 1:
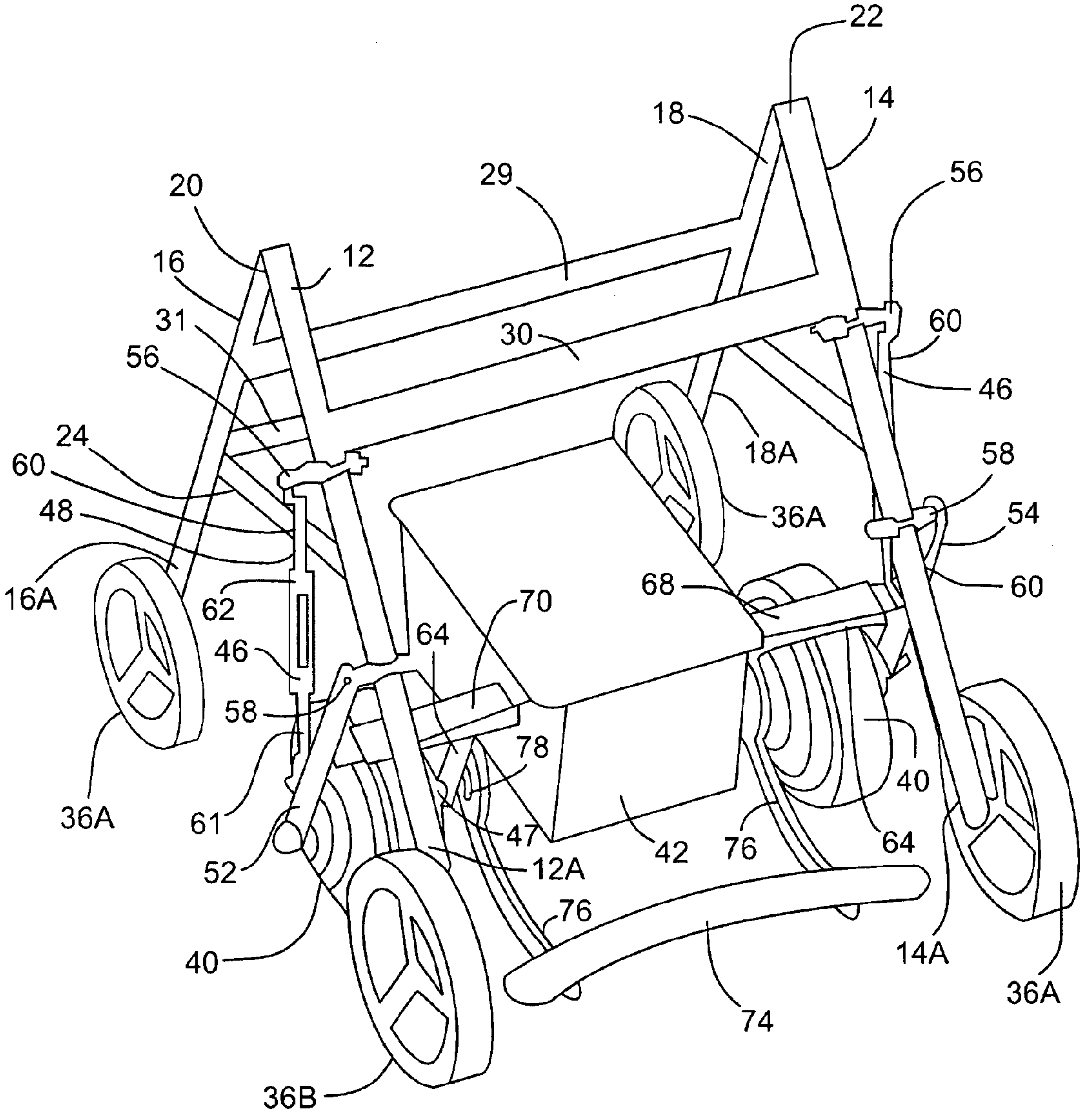
FIG. 1 is a perspective view of an exemplary motorized walker.
Figure 2:
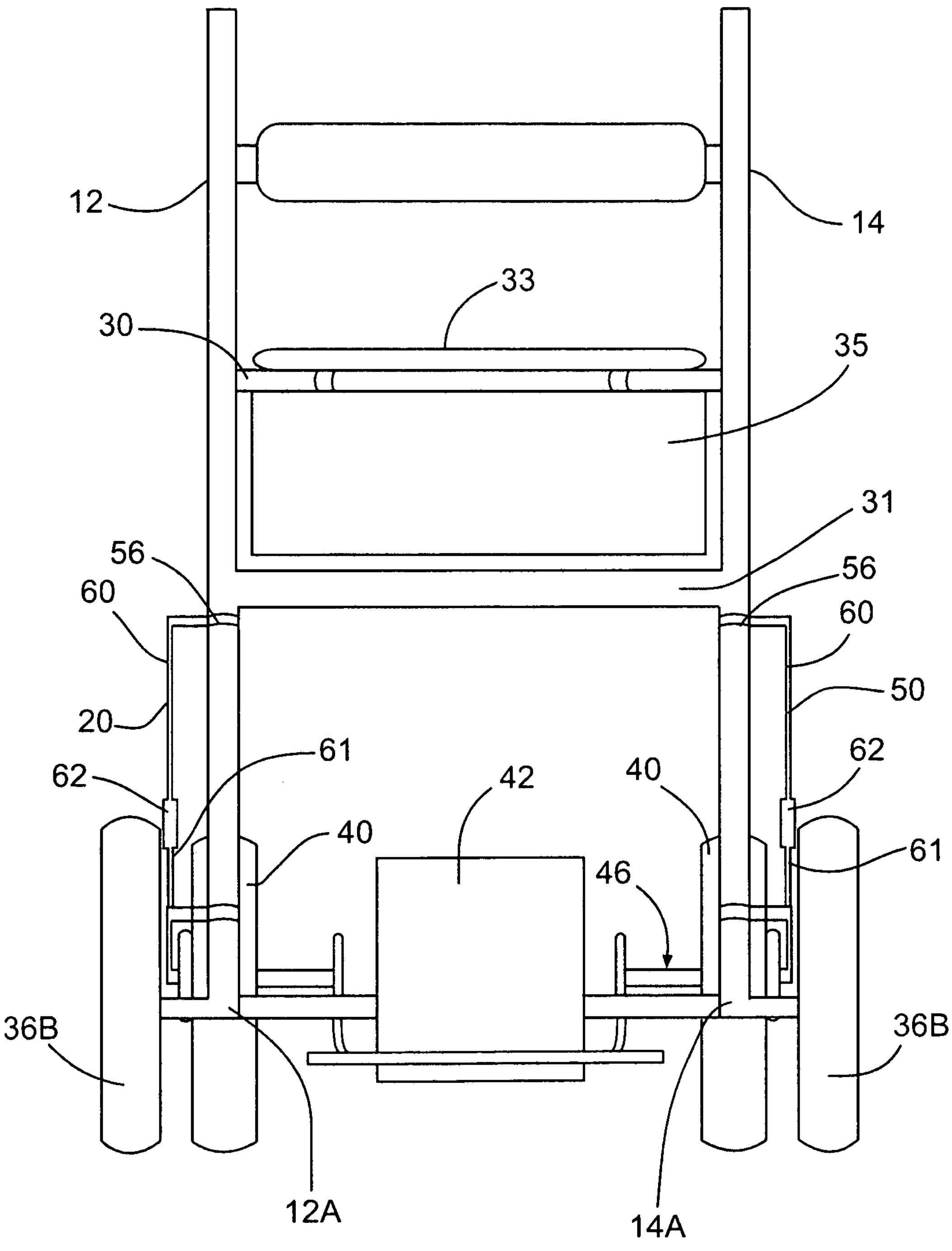
FIG. 2 is a front view of the motorized walker of FIG. 1.
Figure 3:
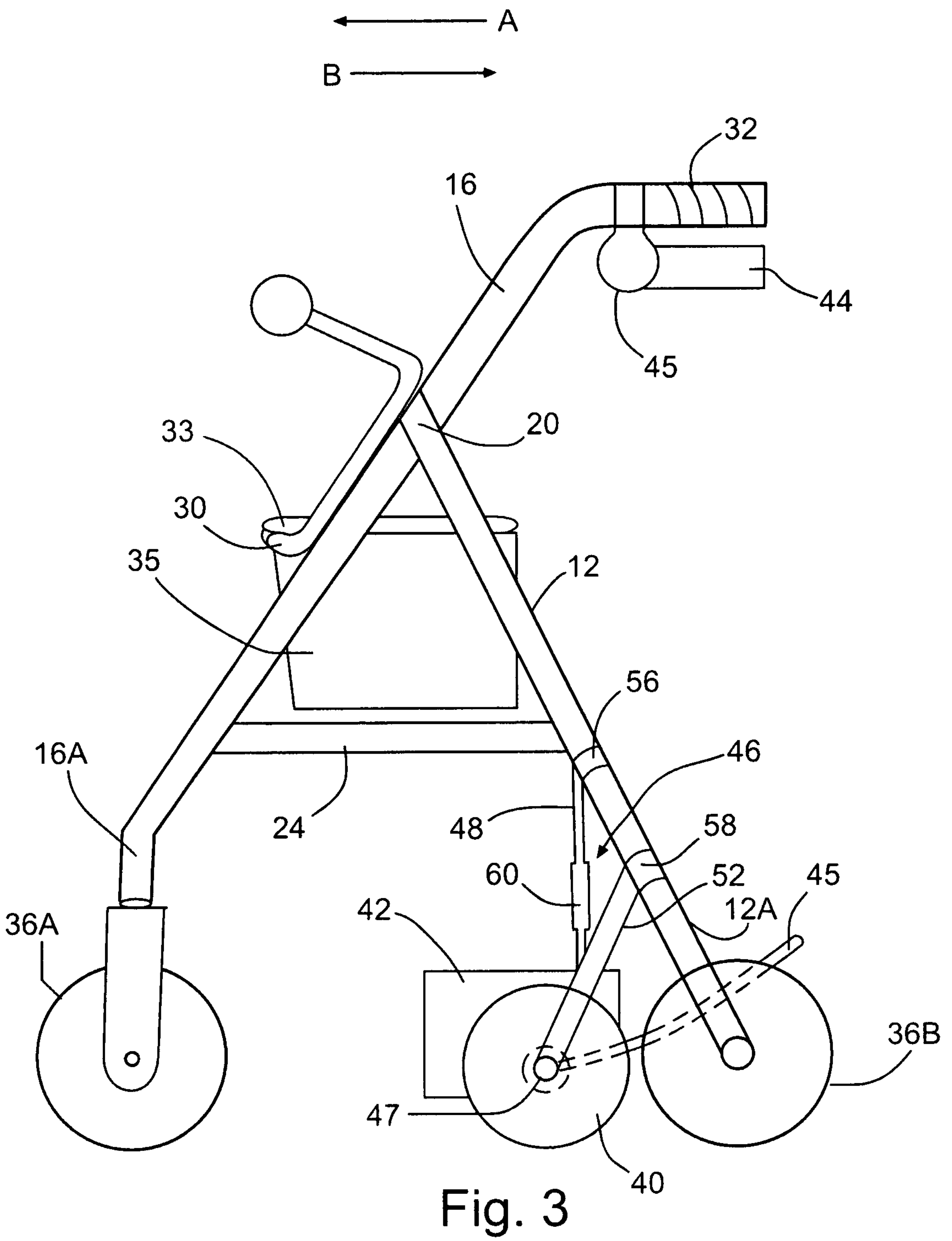
FIG. 3 is a side view of the motorized walker of FIG. 1.

FIGS. 1, 2 and 3 show different views of a walker 10 formed of left and right forward frame components 12 and 14 that terminate in legs 12A and 14A respectively, and left and right rear frame components 16 and 18 that terminate in legs 16A and 18A respectively. The frame components 12 and 16 are angled towards each other in the same plane and connect at a junction 20, while the frame components 14 and 18 are angled towards each other in the same plane and connect at a junction 22. Left and right side struts 24 and 26 respectively connect lower portions of the left frame components 12 and 16, and lower portions of the right frame components 14 and 18. The left frame components 12, 16 and 24 form an A-frame which is attached to an A-frame formed by the right frame components 14, 18 and 26 by upper cross-bars 29 and 30 and lower cross-bar 31. A seat 33, possibly with a depending storage unit 35, is mounted on the frame between the upper cross-bars 29 and 30. At the level of the lower cross-bar 31, which is relatively forward in the frame, there is no rearward cross-bar at the same level, which allows a person's legs to swing forward during operation of the walker 10 without contacting the frame. An upper portion of each of the frame components 12 and 16 extends rearwardly and approximately horizontally to form left and right handles 32 and 34. Legs 12A and 14A, 16A and 18A each have a wheel 36A or 36B for contacting the ground, the wheels including front wheels 36A and rear wheels 36B. Brakes (now shown) may be provided in the usual fashion for walkers, such as on the handles 32, 34.

The components of the walker 10 so far described are conventional. In different embodiments of a motorized walker as claimed, the motorized walker may have various constructions, not limited to the specific design shown, but the motorized walker must at least have a wheel mounted frame, a seat and a weight sufficient for maneuvering by an infirm person. In operation for walking, the normal forward motion is in the direction A (FIG. 3), while in operation as described below for motor driven transport, the normal forward motion is in the direction B (FIG. 3).

Retractable drive wheels 40 are suspended from the frame between the front wheels 36A and the rear wheels 36B. The drive wheels 40 are preferably hub driven wheels in which the wheels are each driven by an internal hub motor about a fixed axle 47, as for example available XTi™ hub motors. Such wheels are conventionally available from a number of manufacturers. Controls 44 for the hub driven wheels 40 are mounted on the frame, as for example on a control mounting bracket 45. Power for the hub driven wheels 40 may be supplied by any conventional power source such as a battery 42. Conveniently, the battery 42 may be mounted under the seat 33. In an embodiment, the battery 42 and retractable drive wheels 40 are mounted on a retractable sub-frame 46. The retractable sub-frame 46 may comprise left and right adjustable struts 48, 50 suspended from respective frame components, such as the left and right forward frame components 12 and 16 on each side of the frame respective, and second struts 52, 54 connected on respective sides of the frame to respective frame components, such as the left and right forward frame components 12 and 16, to form respective triangular frame structures with the respective adjustable struts 48, 50. The depending struts 48, 50, may be secured to the frame components 12 and 16 by respective brackets 56. The second extending struts 52, 54 may be pivotally secured respectively to the frame components 12 and 16 with brackets 58 and may be connected at their lower ends to axles of the retractable drive wheels 40.

The adjustable struts 48, 50 each have a user modifiable length. Various methods may be used to change the length of the struts 48, 50, as for example a screw-type length adjustor, such as the one shown with dual reversed screws 60, 61 and a connector 62 with nuts on each end to connect to the screws 60, 61, a ratchet system, a pneumatic or hydraulic ram, various lever arrangements and various telescoping parts with motorized or manual adjustment. Any suitable length adjustor may be used. The adjustable struts 48, 50 connect to mid-portions of the struts 52, 54 respectively. The struts 48, 50, 52 and 54 should at least have sufficient strength so that the retractable sub-frame 46 will not collapse or buckle in use.

Figure 4:
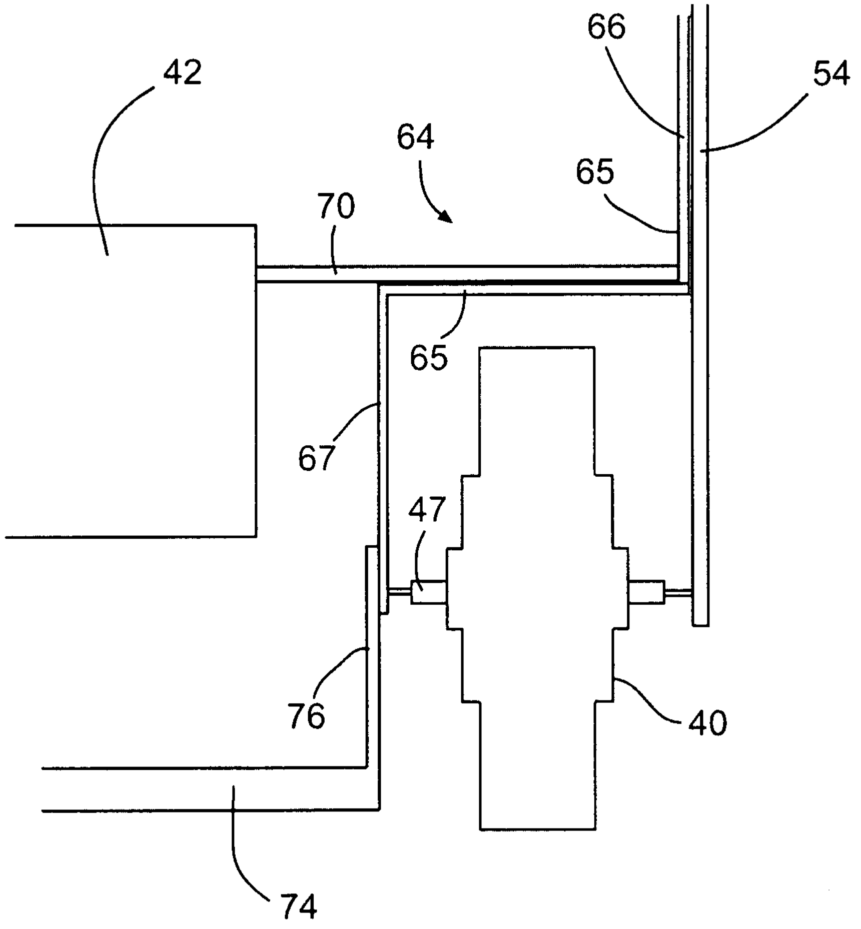
FIG. 4 shows a bracket useful for mounting a motor on the motorized walker of FIG. 1.

The battery 42 is supported by the frame preferably also by being mounted on the retractable sub-frame 46. Z-shaped brackets 64 may be used as shown in FIG. 4. The Z-shaped bracket 64, shown in FIG. 4 has a central portion 65, an upper leg 66 and a lower leg 67 each at right-angles to the central portion 65 but extending in opposite directions to each other. Each upper leg 66 is secured as by bolts to the inside of one of the second struts 52, 54. Each lower leg 67 connects to an inside part of the axle 47 of a corresponding one of the wheels 40. Hence, the Z-shaped brackets 64 in combination with the struts 52, 54 form Y-shaped structures for supporting the wheels 40. Arms 68, 70 extending from the battery housing 72 are respectively secured on top of the central portions 65 of the Z-shaped brackets 64. Other methods may be used to drive the wheels 40. Use of hub motors in the drive wheels 40 facilitates making the retractable drive wheels 40 independently operable, so that the two wheels 40 may be reversed in relation to each other, or caused to rotate at different speeds.

The motorized walker 10 may also include a foot rest 74 connected to at least one of the motor, the retractable drive wheels and the retractable sub-frame. The foot rest 74 shown is connected to respective bottom ends of the Z-shaped brackets 64 by adjustable pivots 76. On each side of the foot rest 74, a butterfly nut and screw (not shown) inserted into slots 78 may be used to secure the foot rest 74 in a suitable position.

The disclosed design may be readily adapted to any walker having a frame supporting a seat, the frame being supported by front ground contacting wheels and rear ground contacting wheels, and having handles on an upper portion of the frame suitable to be gripped by a human. The method of adapting the design to an existing walker and thus making a motorized walker comprises, as exemplified by the attached drawings and described above in relation to a specific embodiment, suspending retractable drive wheels from the frame between the front ground contacting wheels and the rear ground contacting wheels, supporting a motor on the frame, the motor being operably connected to drive the retractable drive wheels; and mounting controls for the motor on the frame.

In operation, the retractable drive wheels 40 may be adjusted up and down by manipulation of the adjustable struts 48, 50. The retractable drive wheels 40 are preferably located closer to one of front wheel sets or the rear wheel sets to provide added stability when the retractable drive wheels 40 are in the extended position and supporting the weight of a user sitting on the seat 33. In the example shown, the drive wheels 40 are located closer to the rearward set (walker mode) or forward set (wheelchair mode) of wheels 36B. When extended, the struts 48, 50 partially support the weight of the user in cooperation with the wheels 36A. To avoid instability, the retractable drive wheels 40 are preferably not located midway between the walker wheels 36A, 36B. Put another way, the center of gravity of the user when seated on seat 33 is preferably not directly above the drive wheels 40.

The embodiments of the invention in which an exclusive property or privilege is claimed are defined as follows:

1. A motorized walker, comprising;

a frame supporting a seat, the frame being supported by front ground contacting wheels and rear ground contacting wheels, and having handles on an upper portion of the frame suitable to be gripped by a human;

retractable motor driven wheels suspended from the frame between the front ground contacting wheels and the rear ground contacting wheels, the retractable motor driven wheels being mounted on a retractable sub-frame that is retractable by user adjustment between a wheelchair mode in which the retractable motor driven wheels are extended and a walker mode in which the retractable motor driven wheels are retracted;

the retractable sub-frame comprising a first adjustable strut suspended from a frame component on a first side of the frame, a second adjustable strut suspended from a frame component on a second side of the frame, each of the first adjustable strut and the second adjustable strut having a user modifiable length, and respective second struts connected on each side of the frame to the respective frame components to form respective triangular frame structures with the respective first adjustable strut and second adjustable strut; and controls for the motor drive wheels mounted on the frame.

2. The motorized walker of claim 1 in which the motor driven wheels are hub motor driven wheels.

3. The motorized walker of claim 1 in which the retractable motor driven wheels comprise independently operable drive wheels.

4. The motorized walker of claim 1 further comprising a foot rest supported by the retractable sub-frame.

5. The motorized walker of claim 4 in which the foot rest is pivotally attached to the retractable sub-frame.

6. A motorized walker, comprising;

a frame supporting a seat, the frame being supported by front ground contacting wheels and rear ground contacting wheels, and having handles on an upper portion of the frame suitable to be gripped by a human;

retractable motor driven wheels suspended from the frame between the front ground contacting wheels and the rear ground contacting wheels, the motor driven wheels being independently operable hub motor driven wheels and being retractable by user adjustment between a wheelchair mode in which the retractable motor driven wheels are extended and a walker mode in which the retractable motor driven wheels are retracted to allow the motorized walker to be operated in walker mode by a human using the handles and in wheelchair mode to allow the retractable motor driven wheels to contact the ground;

the motor driven wheels being mounted on a retractable sub-frame comprising a first adjustable strut suspended from a frame component on a first side of the frame, a second adjustable strut suspended from a frame component on a second side of the frame, each of the first adjustable strut and the second adjustable strut having a user modifiable length and respective second struts connected on each side of the frame to the respective frame components to form respective triangular frame structures with the respective first adjustable strut and second adjustable strut; and controls for the motor drive wheels mounted on the frame.

7. The motorized walker of claim 6 further comprising a foot rest supported by the retractable sub-frame.

8. The motorized walker of claim 7 in which the foot rest is pivotally attached to the retractable sub-frame.

9. A motorized walker, comprising;

a frame supporting a seat, the frame being supported by front ground contacting wheels and rear ground contacting wheels, and having handles on an upper portion of the frame suitable to be gripped by a human;

retractable motor driven wheels suspended from the frame between the front ground contacting wheels and the rear ground contacting wheels, the retractable motor driven wheels being mounted on a retractable sub-frame that is retractable by user adjustment between a wheelchair mode in which the retractable motor driven wheels are extended and a walker mode in which the retractable motor driven wheels are retracted;

the retractable sub-frame comprising a first adjustable strut suspended from a frame component on a first side of the frame, and a second adjustable strut suspended from a frame component on a second side of the frame, each of the first adjustable strut and the second adjustable strut having a user modifiable length;

a foot rest supported by the retractable sub-frame, the foot rest being pivotally attached to the retractable sub-frame; and controls for the motor drive wheels mounted on the frame.

10. A motorized walker, comprising;

a frame supporting a seat, the frame being supported by front ground contacting wheels and rear ground contacting wheels, and having handles on an upper portion of the frame suitable to be gripped by a human;

retractable motor driven wheels suspended from the frame between the front ground contacting wheels and the rear ground contacting wheels, the motor driven wheels being retractable by user adjustment between a wheelchair mode in which the retractable motor driven wheels are extended and a walker mode in which the retractable motor driven wheels are retracted to allow the motorized walker to be operated in walker mode by a human using the handles and in wheelchair mode to allow the retractable motor driven wheels to contact the ground;

the motor driven wheels being independently operable hub motor driven wheels mounted on a retractable sub-frame comprising a first adjustable strut suspended from a frame component on a first side of the frame and a second adjustable strut suspended from a frame component on a second side of the frame, each of the first adjustable strut and the second adjustable strut having a user modifiable length;

a foot rest supported by the retractable sub-frame, the foot rest being pivotally attached to the retractable sub-frame; and controls for the motor drive wheels mounted on the frame.

* * * * *